United States Patent [19]
Watts et al.

[11] 3,962,672
[45] June 8, 1976

[54] TETHERED VEHICLE LOCATION SYSTEM

[75] Inventors: Robert L. Watts; Michael D. Juniper, both of San Diego, Calif.

[73] Assignee: The United States of America as represented by the Secretary of the Navy, Washington, D.C.

[22] Filed: July 16, 1975

[21] Appl. No.: 596,329

[52] U.S. Cl. .............................. 340/6 R; 340/3 T
[51] Int. Cl.² ........................................ G01S 5/18
[58] Field of Search ........................ 340/6 R, 3 T

[56] References Cited
UNITED STATES PATENTS

| | | | |
|---|---|---|---|
| 3,792,424 | 2/1974 | Nakatsuji et al. | 340/6 R |
| 3,860,900 | 1/1975 | Scudder | 340/3 T |

Primary Examiner—Richard A. Farley
Attorney, Agent, or Firm—Richard S. Sciascia; Ervin F. Johnston; Thomas Glenn Keough

[57] ABSTRACT

The location of a tethered undersea vehicle is determined by functionally cooperating elements on the vehicle, the end of a main cable and a support ship. An acoustic signal is projected from the distal end of the main cable and is received by several hydrophones carried on the vehicle. Frequency multiplexing the time deployed or different phases of the received acoustic signal and transmitting them back to the support craft, permits a processing of the multiplexed signals. This processing gives a visual indication of the vehicle's location with respect to the end of the cable. Since ocean currents can cause a catenary effect in the main cable as it hangs in several thousand feet of water, or the support ship might drift off-station, the tethered vehicle cannot be pulled away from an object of interest on the ocean's floor.

10 Claims, 5 Drawing Figures

TETHERED VEHICLE LOCATION SYSTEM

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

Tethered undersea vehicles are in wide spread use in a variety of scientific and commercial applications. The hazard attendant manned submersibles is avoided and prolonged operations at extreme depths are attainable. One recurring problem is the difficulty of knowing the exact location of the vehicle. A support ship suspending a main cable through several thousand feet of ocean has the difficult task of maintaining a preestablished on-station position. This task is further complicated when ocean currents trail the main cable out in a catenary. The effect of these difficulties is that the tethered vehicle is dragged from an object of interest by its tethering whip cable. One attempt to avoid this problem involved the placing of a directional hydrophone on the support vessel and a noise source on the tethered vehicle. The hydrophone on the support vessel is aligned with the noise source and by this means a "fix" is made on the tethered vehicle. However, the resolution of this system is unacceptable when the vehicle is operating at thousand foot or greater depths. At these depths, the area within which the vehicle's noise source could be located could approach nearly a thousand feet in diameter. Even under the best of conditions, the tethered vehicle could be pulled about without giving the vehicle's operators any forewarning.

Another approach uses several hull mounted hydrophones, a transducer and signal processing equipment aboard the support craft. A transponder on the tethered vehicle is triggered by an acoustic signal from the support craft transducer. The hydrophones record the arrivals of the response pulse and suitable processing equipment provides range and bearing information. The accuracy of this system depends on how accurately the position of the hydrophones is known, on the path the acoustic signals take in water, and on the quality of the signal processing equipment aboard the support ship. All three of these variables are factors when considering the inherent random errors of the system. Also to be considered is the fact that the signal processing equipment must be able to interpret the pitch and roll of the ship so as to simulate a stable platform. A further disadvantage of this system is that a large amount of hardware is required. A small computer and, thus, the resultant system cost and operators, manifestly complicate the location of the tethered vehicle.

An alternative is to locate at least three transducer-transponders on the ocean floor. A receiver on the tethered vehicle receives signals from the transducer-transponders and they are compared and processed by equipment on the surface craft. The accuracy of this system is better than the aforediscussed systems. Yet, there is a considerable effort expended when locating and relocating the transponders and their subsequent recalibrations. Needless to say, this is a very time consuming, costly operation.

There is a continuing need in the state of the art for an uncomplicated system for determining the location of a tethered vehicle operating at extreme depths which reduces the possibility of pulling the vehicle from an area of interest by a main support cable.

SUMMARY OF THE INVENTION

This invention is directed to providing an apparatus for locating a tethered vehicle with respect to the distal end of a main cable hanging from a support craft. A transducer mounted on the distal end ensonifies several hydrophones carried on the vehicle. Frequency multiplexed phase variations of the ensonifying signal are fed back to processing equipment aboard the support craft from which the location of the vehicle with respect to the distal end of the main cable is determined.

The prime objection of the invention is to provide an improved tethered vehicle location system.

Still another object is to provide a vehicle location system which is of uncomplicated design and therefore of high reliability.

Another object is to provide a vehicle location system which does not necessitate recalibration upon subsequent deployments.

A further object is to provide a vehicle location system which gives an indication of the location of a tethered vehicle with respect to a distal end of a main cable.

Another object of the invention is to provide a vehicle location system which compensates for the catenary effect induced by ocean currents acting on a main cable.

Still another object is to provide a vehicle location system which eliminates the possibility of the tethered vehicles being pulled from an object of interest.

These and other objects of the invention will become more readily apparent from the ensuing description when taken with the drawings.

DESCRIPTION OF THE PREFERRED EMBODIMENT

Figure 1:
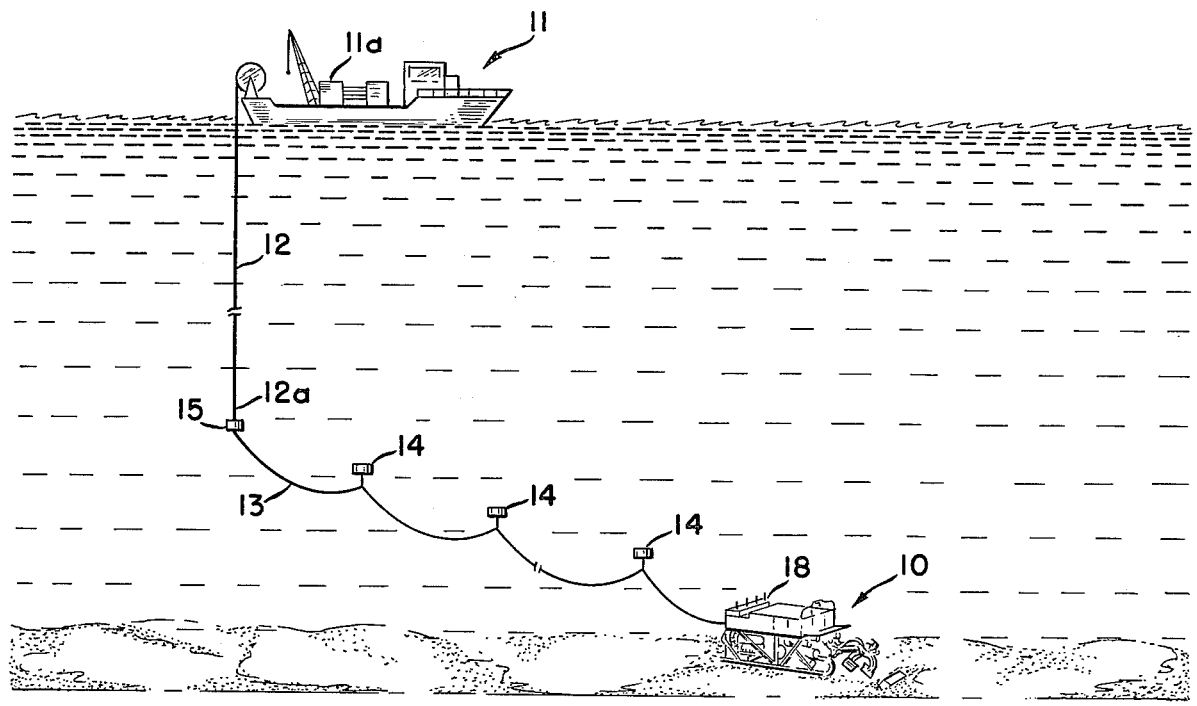
FIG. 1 is an isometric depiction of a tethered vehicle operationally deployed.

Referring now to the drawings, FIG. 1 depicts a tethered vehicle 10 working on-station. A representative tethered vehicle is the cable-controlled underwater recovery vehicle (CURV) and its variations which are capable of operating and doing work at depths in excess of several thousand feed.

A support craft 11 houses an electronics module 11a and plays out a main cable 12 from a large spool carried on the afterdeck. The main cable is suitably designed to withstand the rigors of a deep ocean environment and contains power and command and control conductors. Since the main cable is substantially built, its own weight causes it to hang nearly straight down. However, strong ocean currents can bend it into a slight catenary shape. However, such an effect can be ignored by this disclosed invention.

At the distal end 12a of the main cable a whip cable 13 extends to the tethered vehicle. Several floats 14 along the whip cable render it neutrally buoyant so as not to overly interfere with the operation of the tethered vehicle. The whip cable like the main cable is fabricated according to well proven deep ocean design criteria to withstand the crushing ambient pressures and corrosive environment.

To prevent snagging and to allow greater freedom within the vehicle's working radius, the distal end of the main cable is held about one hundred feet from the ocean floor. The up to six hundred foot length of the whip cable reaches downwardly to the vehicle in a more or less even slope above any obstacles that may be on the ocean's floor.

Working at a several thousand feet depth does present a problem which interferes with the vehicle's ability to function effectively. The location of the tethered vehicle with respect to the distal end of the main cable must be known to avoid pulling the vehicle about on the bottom. If the supporting craft drifts or ocean currents shape the main cable in a catenary, the vehicle can be pulled away from an object of interest. Not only is there the risk of damaging the vehicle but once it is dislocated, reorientation and relocation is a time consuming, frustrating task.

This problem largely has been avoided by the present invention. A transducer of acoustic energy 15 projects an ensonifying signal throughout the water. A typical undersea operation usually relies on several different acoustic frequencies to effect command in control of the tethered vehicle. Since the ensonifying signal need only travel a relatively short distance to the tethered vehicle a relatively high frequency signal is selected that is in a passband away from the spectrum of the command and control frequencies. For example, a 52.5 kilohertz signal has been used for this purpose and it is not overly attenuated in the relatively short, 600 foot range anticipated.

The transducer projects a burst of the ensonifying signal when clock circuitry 16 in electronics module 11a on the support craft initiates an oscillator-amplifier circuit 17 also in the module. The electrical impulse is projected from transducer 15 through the water to hydrophone-receiver circuit 18 carried on tethered vehicle 10.

Figure 2:
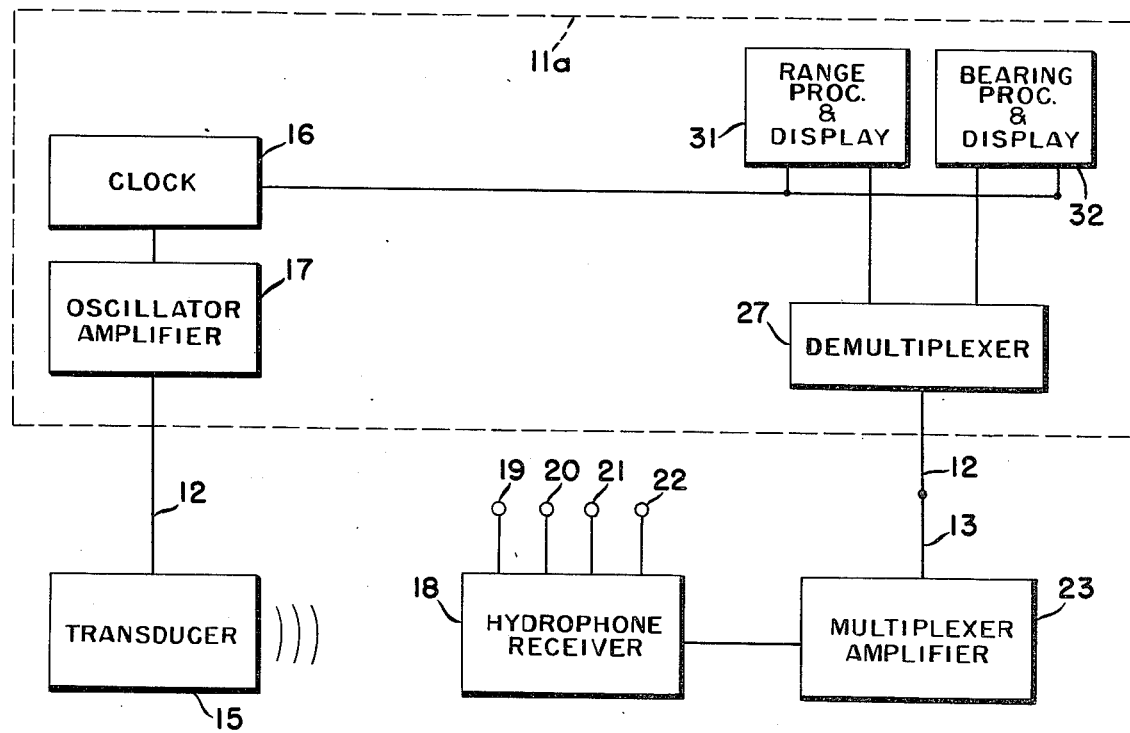
FIG. 2 shows in block diagram form the main constituents of this invention.
Figure 3A:
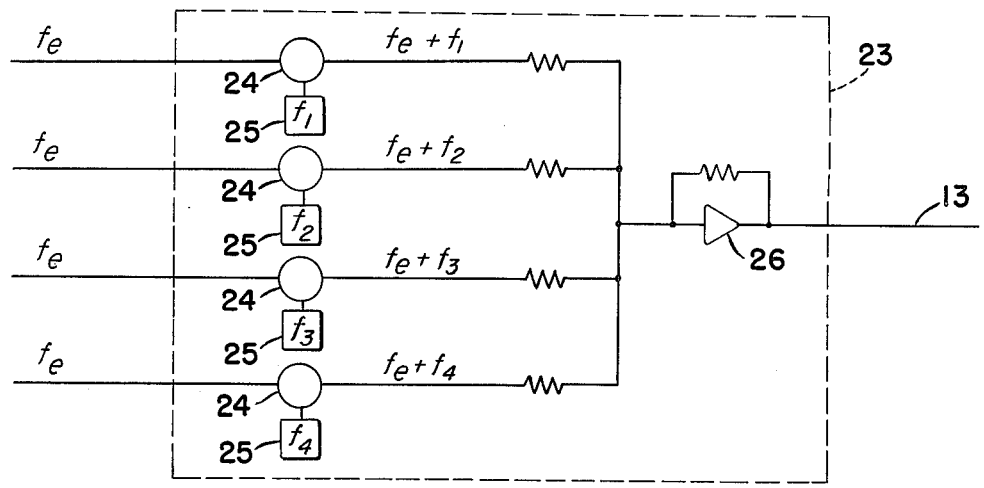
FIG. 3a schematically shows the multiplexer amplifier stage.
Figure 3B:
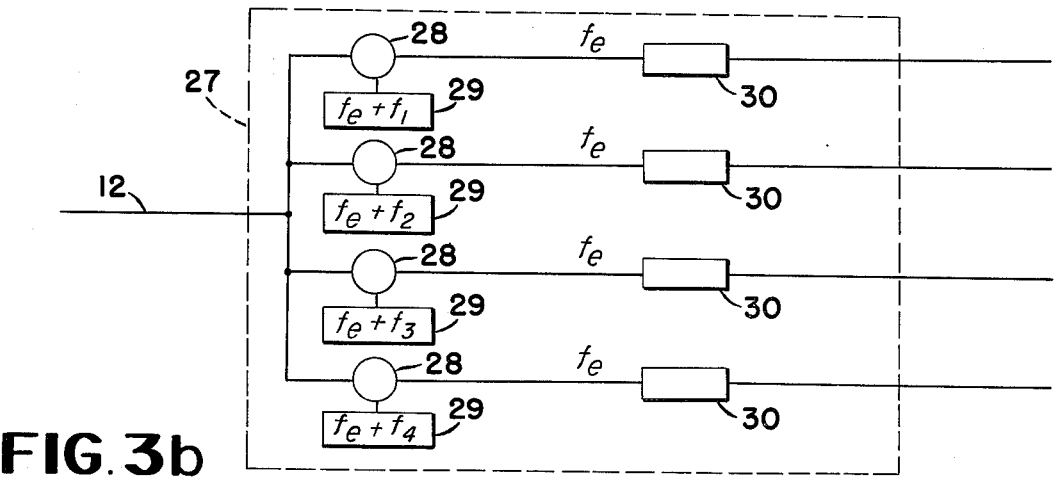
FIG. 3b shows the demultiplexer circuit.
Figure 4:
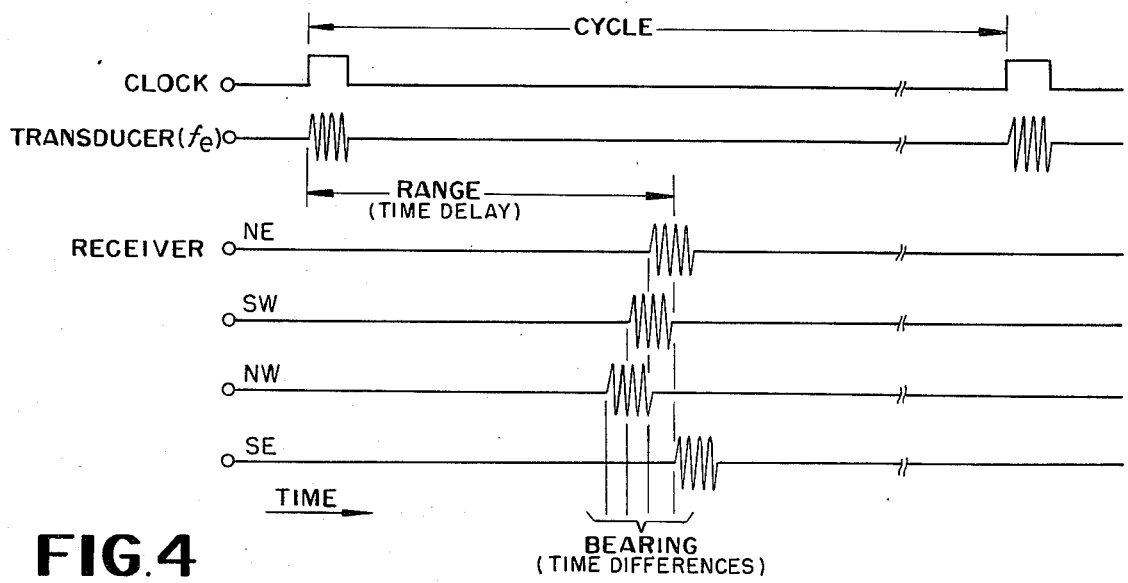
FIG. 4 is a graphical representation of signals processed to provide representative range and bearing information.

Four orthogonal disposed hydrophones 19 through 22 are ensonified by the impulse. Thus, representative signals are created which are time delayed or phase shifted with respect to one another. It should be pointed out that the hydrophones depicted in FIG. 2 might appear to be in line. This is not so, since the hydrophones are mounted at a relative position with respect to one another at the apexes of an imaginary square.

These electrical signals are passed to an interconnected multiplexer-amplifier circuit 23 prior to being transmitted to electronics module 11a on the support craft. In the multiplexer-amplifier four mixers 24 are each coupled to a separate oscillator 25, each of which generates a discrete signal designated $f_1$, $f_2$, $f_3$, or $f_4$.

When the time delayed or phase shifted variations of the ensonifying frequency, $f_e$, appears on the input side of the multiplexer-amplifier circuit, then the signals appearing on the output sides of the mixers are the algebraic product of the time delayed or phase shifted ensonifying frequency and the several discrete mixing frequencies. These composite signals are fed to a following line driver 26, through whip cable 13, to the main cable 12 and back to electronics module 11a carried on surface support craft 11.

A demultiplexer circuit 27 includes several demodulators 28 each connected to a discrete oscillator 29. These oscillators each have a frequency which is equal to the product of the ensonifying signal and one of the frequencies $f_1$, $f_2$, $f_3$ or $f_4$ of the several oscillators 25. The outputs of demodulators 28 are the time delayed or phase shifted bursts of the ensonifying signal received by the orthogonally disposed hydrophones 19 through 22.

These bursts are fed through identical filters 30 to remove unwanted frequency components and then onto a suitable range processing and display circuitry 31 and an appropriate bearing processing and display circuitry 32. These two circuits are well within the current state of the art and elaboration thereon is felt to be unnecessary.

Since the range and bearing circuitry and display are synchronized and controlled by the clock circuit meaningful information can be gleaned from the reflected bursts of the ensonifying frequency. The separation of the tethered vehicle 10 from transducer 15 on distal end 12a of main cable 12 is a function of time. The orientation of the hydrophones is reflected by noting the relative times when the burst of the ensonifying frequency reaches the several orthogonally disposed hydrophones. Accurate representations of range and bearing can be made by conventional range and bearing electronics to give a real time readout of the relative location of the tethered vehicle with respect to the distal end of the cable. Any catenary or drifting of the cable will not affect this relationship.

Obviously, many modifications and variations of the present invention are possible in the light of the above teachings. It is therefore to be understood that within the scope of the appended claims the invention may be practiced otherwise than as specifically described.

What is claimed is:

1. In a deep ocean system an apparatus for locating a tethered vehicle with respect to the distal end of a cable hanging from a support craft comprising:
    means extending from the distal end of the cable for coupling signals between the cable and the vehicle;
    means mounted on the distal end of the cable for transmitting an ensonifying signal;
    means carried on the vehicle for receiving phase variations of the acoustic signal;
    means on the support craft for processing a cycle of the phase variations of the ensonifying signal into range and bearing information.

2. An apparatus according to claim 1 further including:
    means on the support craft coupled to the transmitting means and the processing means for simultaneously initiating the ensonifying signal and the cycle.

3. An apparatus according to claim 2 further including:
    means on the support craft connected to the processing means for displaying the range and bearing information.

4. An apparatus according to claim 3 further including:
    means connected along the length of the coupling means for rendering it neutrally buoyant.

5. An apparatus according to claim 4 in which the transmitting means is a transducer projecting the ensonifying signal through seawater to the receiving means on the vehicle and the coupling means is an elongate whip conductor feeding power and phase variations of the ensonifying signal between the cable and the vehicle.

6. An apparatus according to claim 5 in which the receiving means includes a plurality of hydrophones each providing one of the phase variations of the ensonifying signal and a frequency multiplexer unit.

7. An apparatus according to claim 6 in which the processing means includes a demultiplexer unit coupled to receive the phase variations of the ensonifying signal.

8. An apparatus according to claim 7 in which there are four hydrophones orthogonally disposed with respect to each other for collectively receiving up to four phase variations of the ensonifying signal.

9. An apparatus according to claim 8 in which the cable assumes the shape of a catenary between the surface craft and the distal end.

10. An apparatus according to claim 9 in which the distal end of the cable is held approximately one hundred feet above the ocean floor to avoid snagging the elongate whip conductor.

* * * * *